United States Patent
Tomaru et al.

(10) Patent No.: US 6,447,611 B1
(45) Date of Patent: Sep. 10, 2002

(54) COATING APPARATUS

(75) Inventors: Mikio Tomaru; Norio Shibata, both of Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/448,505

(22) Filed: Nov. 24, 1999

(30) Foreign Application Priority Data

Nov. 27, 1998 (JP) ............................................ 10-337729

(51) Int. Cl.⁷ ................................................. B05C 3/02
(52) U.S. Cl. ........................................ 118/413; 118/410
(58) Field of Search ................................. 118/410, 413, 118/419, 123, 100, 121, 122, 126; 427/356

(56) References Cited

U.S. PATENT DOCUMENTS

| | | | |
|---|---|---|---|
| 4,577,362 A | * | 3/1986 | Tanaka et al. |
| 4,984,533 A | | 1/1991 | Takahashi et al. .......... 118/419 |
| 5,097,792 A | * | 3/1992 | Umemura et al. |
| 5,643,363 A | * | 7/1997 | Hosogaya et al. |

FOREIGN PATENT DOCUMENTS

| | | | |
|---|---|---|---|
| EP | 0 537 778 A1 | 4/1993 | |
| EP | 0 559 465 A1 | 9/1993 | |
| EP | 0 593 957 A1 | 4/1994 | |
| JP | 2-207865 | * 8/1990 | |
| JP | 2-207866 | * 8/1990 | |
| JP | 2691602 | 9/1997 | ............. B05C/5/02 |

OTHER PUBLICATIONS

European Search Report.

* cited by examiner

*Primary Examiner*—Brenda Adele Lamb
(74) *Attorney, Agent, or Firm*—Sughrue Mion, PLLC

(57) ABSTRACT

A coating apparatus (10) has a coating head having a front edge surface (11) and a doctor edge surface (12). The coating head of the coating apparatus (10) is pressed onto a flexible support (100) laid and running between pass rollers (101) so that the support (100) can be coated with coating composition. The doctor edge surface (12) of the coating apparatus (10) is formed so that the variation rate, in the support width direction, of blade thickness in the support running direction of the doctor edge surface (12) does not exceed 5%.

5 Claims, 4 Drawing Sheets

COATING APPARATUS

FIELD OF THE INVENTION

The present invention relates to a coating apparatus for coating a flexible support with coating composition in order to form a magnetic recording medium, a photographic sensitive material, an electronic material, a coating-type battery, an optical film for anti-reflection or the like, abrasive tape, information recording paper, etc.

BACKGROUND OF THE INVENTION

Coating apparatus for simultaneously forming a single layer or a plurality layers of thin coatings on a flexible support of plastic or the like at a high speed are disclosed in JP-B-5-8065, JP-B-6-77712, and so on.

In producing a magnetic recording medium or the like, it is requested to apply coating composition such as magnetic liquid or the like onto a flexible support to a predetermined thickness with precision. To this end, JP-B-7-106332 proposes a coating apparatus which can adjust the coating thickness of coating composition. In this coating apparatus, the width of a coating composition supply channel (slit) is adjusted to change the loss of pressure inside the channel so that the discharge amount of coating composition is adjusted. According to this coating apparatus, it is possible to form a coating with a substantially uniform thickness over the whole area of a wide flexible support which is running.

On the other hand, Japanese Patent No. 2,691,602 proposes a method in which the swell of each edge surface of an extrusion-type coating apparatus is reduced in order to restrain coating failures such as coating streaks or the like.

In the coating apparatus disclosed in JP-B-7-106332, however, it was impossible to adjust the variation in coating thickness in the width direction of a product having a width of a few millimeters, such as a magnetic tape. In addition, when the adjusted amount of the slit width was large in this coating apparatus, the relationship of height between the front edge surface and the doctor edge surface changed so that the shape of a liquid reservoir was transformed. As a result, there might arise coating failures such as coating unevenness, coating streaks or the like, other than thickness variation.

Further, if the swell of each edge surface of an extrusion-type coating apparatus was merely reduced as proposed in Japanese Patent No. 2,691,602, there might still arise coating failures.

SUMMARY OF THE INVENTION

The present invention was developed on the basis of the above-mentioned background. It is an object of the present invention to provide a coating apparatus which can apply coating composition onto a flexible support without producing any variation in thickness or any coating failure.

The above object of the present invention can be achieved by the following configurations.

(1) An extrusion-type coating apparatus having a configuration in which a coating head having a front edge surface and a doctor edge surface is pressed onto a flexible support laid so as to run between pass rollers so that the coating head applies coating liquid discharged from a slit onto the flexible support; wherein blade thickness of the doctor edge surface in a direction of running of the support has a rate of variation not exceeding 5% in a direction of width of the support.

(2) A coating apparatus according to the above item (1), wherein the doctor edge surface has a curved surface, and a deviation of a curvature center of the curved surface in the direction of the blade thickness does not exceed 5% of blade thickness of the curved surface.

(3) A coating apparatus according to the above item (1) or (2), wherein a deviation of width of the slit does not exceed 5 $\mu$m.

(4) A coating apparatus according to any one of the above items (1) to (3), wherein a deviation of a difference of height between adjacent edge surfaces of the coating head does not exceed 5 $\mu$m.

BRIEF DESCRIPTION OF THE DRAWINGS

In the accompanying drawings.

DETAILED DESCRIPTION OF THE INVENTION

Figure 1:
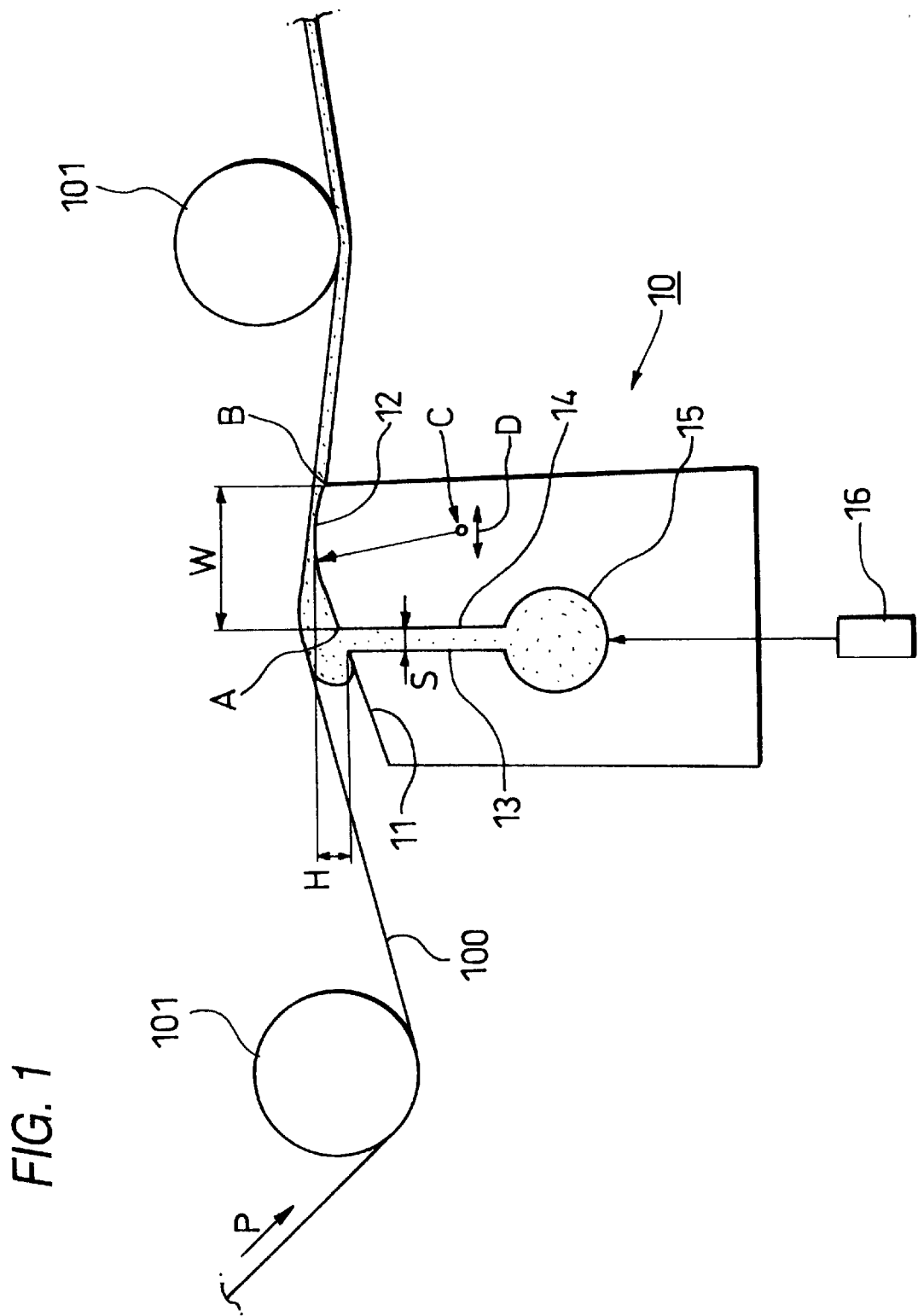
FIG. 1 is a diagram showing an embodiment of the present invention.

In the background art, investigation has been never made about uniformity of blade thickness of a doctor edge surface. Here, the term of "blade thickness of the doctor edge surface" means a distance W between a slit surface 14 passing through a point A which is the upstream end of a doctor edge surface 12 and a line which is drawn in parallel to the slit surface 14 so as to pass through a point B which is the downstream end of the doctor edge surface 12 as shown in FIG. 1 which is a longitudinally sectional view of the coating head. Examples of the doctor edge surface include a curved surface expressed by an arc line in the longitudinally sectional view of the coating head as shown in FIG. 1; a surface constituted by a combination of a curved surface and a flat surface; a flat surface or a surface constituted by a combination of flat surfaces; a surface expressed by a multidimensional curve in the longitudinally sectional view of the coating head; and so on. As for the material forming the doctor edge surface, it is preferable to use hard material such as hard metals or the like disclosed in Japanese Patent No. 2,753,851.

This blade thickness of the doctor edge surface has a variation in a direction of width of the flexible support (the direction perpendicular to the paper surface of FIG. 1) due to a manufacturing error and so on. In the present invention, the degree of this variation of blade thickness is defined by a variation rate R of blade thickness calculated by the following formula [1].

$$R(\%)=(W\max-(W\max+W\min)/2)/((W\max+W\min)/2)\times 100 \quad [1]$$

In the formula [1], Wmax designates a maximum value of the blade thickness, and Wmin designates a minimum value of the blade thickness.

As the result of diligent investigation, the present inventors found out that thickness variation of coating and coating failures such as coating unevenness, coating streaks or the like could be restrained conspicuously by making the variation rate R of the blade thickness of the doctor edge surface not larger than 5%, as shown in the configuration of the above-mentioned item (1). If the variation rate R is further reduced and brought close to 0%, the finishing cost increases. It is however impossible to reduce thickness variation of coating and coating failures correspondingly to the increase of the finishing cost. Therefore, it will go well if the variation rate R of the blade thickness does not exceed 5%.

In addition, the present inventors found out that thickness variation of coating and coating failures could be restrained further conspicuously with the configuration shown in the above-mentioned items (2) to (4).

In the item (2), the deviation of the curvature center in the blade thickness direction means a distance D between a point which is furthermost upstream from a designed regular position of a curvature center C of a curved surface in the doctor edge surface and a point which is furthermost downstream therefrom when the position of the curvature center C is measured in a direction of width of the flexible support (the direction perpendicular to the paper surface of FIG. 1), as shown in FIG. 1. In addition, the term of "blade thickness of curved surface" herein means a distance between a line which is drawn so as to pass through the upstream end of a curved surface forming at least a part of the doctor edge surface and so as to be in parallel with a slit surface passing through the upstream end of the doctor edge surface and another line which is drawn so as to pass through the downstream end of the curved surface and so as to be in parallel with the slit surface in the same manner as the first-mentioned line.

In the above item (3), the deviation of width of the slit means a difference between a maximum value and a minimum value of the slit width (a distance S between a slit surface 13 on a front edge surface 11 side and a slit surface 14 on a doctor edge surface 12 side in FIG. 1) when the slit width is measured in a direction of width of the flexible support.

In the above item (4), the difference of height between adjacent edge surfaces means a distance, in a direction along the slit surface, between a point which is closest to the flexible support in the upstream edge surface and a point which is closest to the support in the downstream edge surface. The deviation of the difference of height between the edge surfaces means a difference between a maximum value and a minimum value of the difference of height between the edge surfaces when the difference is measured in a direction of width of the flexible support.

Although anymode disclosed in JP-B-5-8065, JP-B-6-77712, JP-A-5-212337, JP-A-6-134380, -JP-B-7-106332 and so on may be used as an extrusion-type coating apparatus in the present invention, it is not limited to these modes. An embodiment of the present invention will be described below in detail with reference to the drawings.

FIG. 1 shows an extrusion-type coating apparatus 10 for single-layer coating. A coating head of the coating apparatus 10 is pressed onto a flexible support 100 laid between pass rollers 101 and running in a running direction P. The coating head has a front edge surface 11 disposed upstream in the running direction P of the support, and a doctor edge surface 12 disposed downstream. Coating composition is discharged from a slit of slit width S between the respective edge surfaces. The coating apparatus 10 includes a liquid reservoir 15 communicating with the slit. Coating composition is supplied from a coating composition supply source 16 to the liquid reservoir 15 through a pump means (not shown) or the like.

The front edge surface 11 of the coating apparatus 10 is formed into a slope which substantially approximates an angle of approach of the support 100. On the other hand, the doctor edge surface 12 is formed into a convexly curved surface in which a distance between the doctor edge surface 12 and the support 100 substantially gradually decreases from an upstream end A of the doctor edge surface 12 to a downstream end B thereof. That which has a blade thickness W of about 0.05 to 10 mm is usually used as the doctor edge surface 12.

The doctor edge surface 12 is formed so that the variation rate of the blade thickness does not exceed 5%. When the blade thickness has a variation, coating is thinned in a portion where the blade thickness is larger. However, if the variation rate of the blade thickness is not larger than 5% as in this embodiment, the thickness variation of coating can be restrained to an extent which counts for nothing.

In addition, the coating head is formed so that the deviation in the blade thickness direction of the curvature center C of the doctor edge surface 12 which is a curved surface does not exceed 5% of the blade,thickness W. Sectional shapes were measured at several places in a direction of width of a block having the doctor edge surface 12 by use of a contact-type form measuring device, a form measuring device using laser reflection, or the like, and the deviation of the curvature center C was calculated from a drawing of those sectional shapes.

In addition, the coating head is formed so that the deviation of slit width S does not exceed 5 μm. The slit width S can be measured by a taper gauge, an air micrometer, or the like.

In addition, the coating head is formed so that the deviation of a difference H of height between the front edge surface 11 and the doctor edge surface 12 does not exceed 5 μm. The height of the front edge surface 11 and the doctor edge surface 12 can be measured by a height gauge, a tool maker's microscope, or the like.

The present invention is not limited to the embodiment described above. It is preferable to apply the present invention to a coating apparatus, for example, disclosed in JP-A-6-296917, in which a coating head has separate blocks forming edge surfaces and a slit, and each block can move in a direction along the slit surface. At this time, it is necessary to establish the deviation of a difference of height between the edge surfaces to be not larger than 5 μm.

Effects of the present invention will be described below more clearly on the basis of examples, in which "parts" and "ratios" are indicated by weight.

EXAMPLE 1

Figure 2:
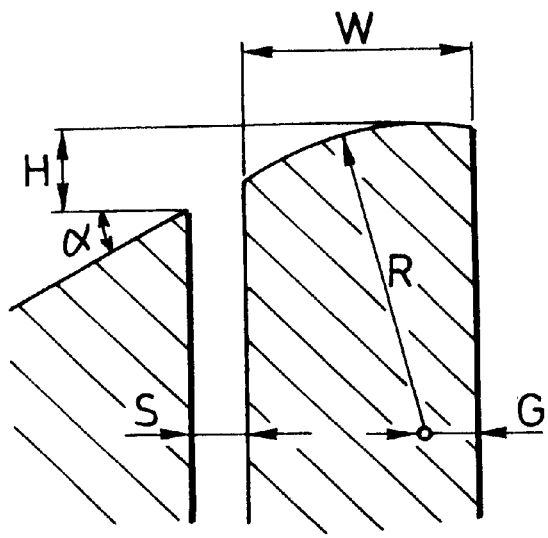
FIG. 2 is a diagram for explaining Example 1 of the present invention.

Four kinds of coating heads for single-layer coating were prepared. Each of the coating heads had a longitudinally sectional shape as shown in FIG. 2, and it was 500 mm wide in the width direction of a flexible support (not shown), but the coating heads were different in the variation rate of blade thickness W of the doctor edge surface. Such coating heads were used to apply coating composition so that the average value of dry thickness was 2.0 μm. As for the coating composition, the following compositions were mixed by a continuous kneader and thereafter dispersed by a sandmill. One part of polyisocyanate was added to the fluid dispersion obtained thus, and 40 parts of butyl acetate were further added thereto. The coating composition filtered by a filter having an average pore size of 1 μm was used as the coating composition.

<Coating Composition>

| | |
|---|---|
| Ferromagnetic metal magnetic powder | 100 parts |
| composition Fe/Zn/Ni = 92/4/4 | |
| Hc | 1600 Oe |
| specific surface area by BET method | 60 m$^2$/g |
| crystallite size | 195 Å |
| average major axis length | 0.20 μm |
| major-to-minor axial ratio | 10 |
| saturation magnetization (σs): | 130 emu/g |
| surface finishing agent: Al$_2$O$_3$, SiO$_2$ | |
| Vinyl chloride copolymer | 12 parts |
| containing —SO$_3$Na group of 1 × 10$^{-4}$ eq/g | |
| degree of polymerization | 300 |
| Polyester-polyurethane resin | 3 parts |
| neopentyl glycol/cuprolactone polyol/MDI = 0.9/2.6/1 | |
| containing —SO$_3$Na group of 1 × 10$^{-4}$ eq/g | |
| α-alumina (average particle size 0.3 μm) | 2 parts |
| Carbon black (average particle size 0.10 μm) | 0.5 part |
| Butyl stearate | 1 part |
| Stearic acid | 2 parts |
| Methyl ethyl ketone | 90 parts |
| Cyclohexanone | 50 parts |
| Toluene | 60 parts |

The results of examining the thickness variation rate of coating at this time are shown in Table 1. The thickness variation rate T of coating can be calculated by using the following expression [2] and substituting a maximum value of coating thickness for Tmax and a minimum value of the coating thickness for Tmin.

$$T(\%)=(T\max-(T\max+T\min)/2)/((T\max+T\min)/2)\times100 \quad [2]$$

In each of the four kinds of coating heads, the deviation of the curvature center of a doctor edge surface was 3% of the blade thickness of the doctor edge surface, the deviation of slit width was 3 μm, and the deviation of a difference of height between adjacent surfaces was 2 μm. As for the designed dimensions of the coating heads, doctor edge surface blade thickness W=1.0 mm, curvature radius R=4.0 mm, curvature center position G=0.1 mm, slit width S=0.2 mm, edge surface height difference H=0.15 mm, and front edge surface slope angle α=25°.

TABLE 1

| blade thickness variation rate R (%) | coating thickness variation rate T (%) | judgment result |
|---|---|---|
| 12 | 25 | × |
| 7 | 15 | × |
| 5 | 5 | ○ |
| 6 | 0 | ○ |

As shown in Table 1, when the variation rate R of blade thickness of the doctor edge surface was 12% or 7%, the variation rate T of coating thickness became a high value of 25% or 15% correspondingly. On the other hand, when the variation rate R of blade thickness of the doctor edge surface was 5% or 3%, the variation rate T of coating thickness could be restrained to an extremely low value of 5% or 6% correspondingly. It was therefore found that it was possible to restrain the thickness variation of coating conspicuously if the variation rate of blade thickness of the doctor edge surface does not exceed 5%. It was also found that no coating failure was produced at this time.

EXAMPLE 2

Figure 3:
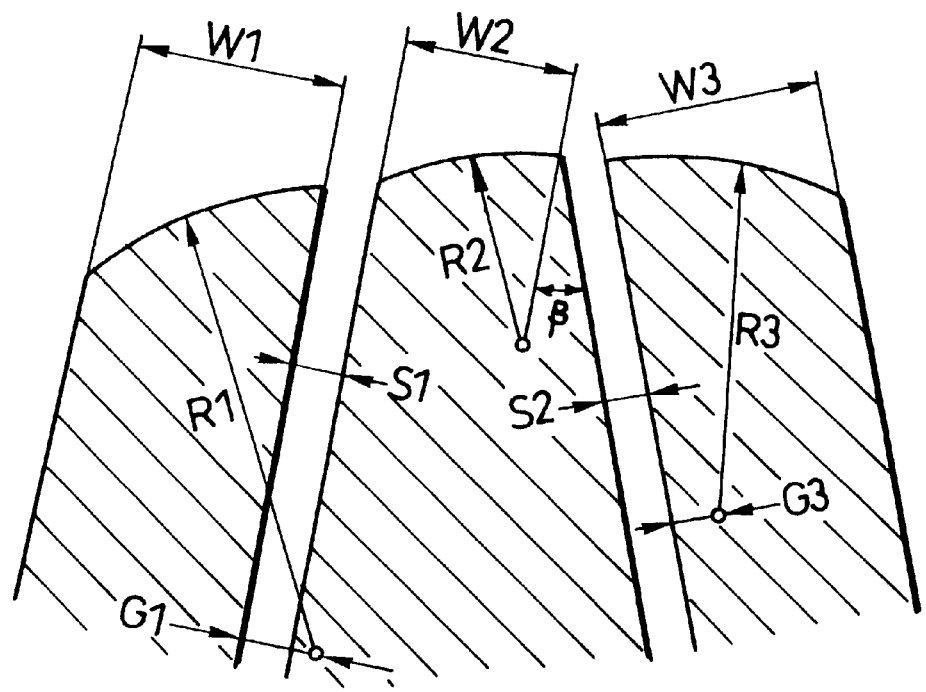
FIG. 3 is a diagram for explaining Example 2 of the present invention.

Four kinds of coating heads for two-layer coating were prepared. Each of the coating heads had a longitudinally sectional shape as shown in FIG. 3, and it was 1 m wide in the width direction of a flexible-support (not shown), but the coating heads were different in the variation rate of blade thickness W2 of an intermediate doctor edge surface and the variation rate of blade thickness W3 of a downstream doctor edge surface. Such coating heads were used to apply coating composition so that a lower layer was 1.0 μm thick and an upper layer was 0.5 μm thick. As for the coating composition, the following compositions were mixed by a continuous kneader and thereafter dispersed by a sandmill. One part of polyisocyanate was added to the fluid dispersion obtained thus for the lower non-magnetic layer while three parts of polyisocyanate were added to the fluid dispersion for the upper magnetic layer. Further, 40 parts of butyl acetate was added to the coating compositions for the lower non-magnetic layer and the upper magnetic layer respectively. The coating compositions were filtered by a filter having an average pore size of 1 μm. In such a manner, the coating compositions for the lower non-magnetic layer and the upper magnetic layer were prepared respectively.

<Lower Non-magnetic Layer Coating Composition>

| | |
|---|---|
| Inorganic powder TiO$_2$ | 80 parts |
| average particle size | 0.035 μm |
| crystal system rutile | |
| TiO$_2$ content | 90 weight % |
| inorganic powder surface treatment layer | (10 weight %) |
| Al$_2$O$_3$ | |
| specific surface area by BET method | 40 m$^2$/g |
| DBP oil absorption | 27 to 38 g/100 g |
| pH | 7.0 |
| Carbon black | 20 parts |
| average particle size | 16 μm |
| DBP oil absorption | 80 ml/100 g |
| pH | 8.0 |
| specific surface area by BET method | 250 m$^2$/g |
| volatile content | 1.5% |
| Vinyl chloride- vinyl acetate-vinyl alcohol co- | 12 parts |
| polymer containing a polar group of | |
| —N(CH$_3$)$_3$$^+$Cl$^-$ of 5 × 10$^{-6}$ eq/g | |
| composition ratio: 86:13:1 | |
| degree of polymerization | 400 |
| Polyester-polyurethane resin | |
| neopentyl glycol/caprolactone polyol/MDI = | |
| 0.9/2.6/1 containing —SO$_3$Na group of | |
| 1 × 10$^{-4}$ eq/g | |
| Butyl stearate | 1 part |
| Stearic acid | 1 part |
| Methyl ethyl ketone | 100 parts |
| Cyclohexanone | 50 parts |
| Toluene | 50 parts |

<Upper Magnetic Layer Coating Composition>

| | |
|---|---|
| Ferromagnetic metal magnetic powder | 100 parts |
| composition Fe/Zn/Ni = | 92/4/4 |
| Hc | 1600 Oe |
| specific surface area by BET method | 60 m$^2$/g |
| crystallite size | 195 Å |
| average major axis length | 0.20 μm |
| major-to-minor axial ratio | 10 |
| saturation magnetization (σs): | 130 emu/g |
| surface finishing agent: Al$_2$O$_3$, SiO$_2$ | |
| Vinyl chloride copolymer | 12 parts |
| containing -SO$_3$Na group of 1 × 10$^{-4}$ eq/g | |
| degree of polymerization | 300 |
| Polyester-polyurethane resin | 3 parts |
| neopentyl glycol/caprolactone polyol/MDI = 0.9/2.6/1 | |

-continued

| | |
|---|---|
| containing —SO$_3$Na group of $1 \times 10^{-4}$ eq/g | |
| O-alumina (average particle size 0.3 μm) | 2 parts |
| Carbon black (average particle size 0.10 μm) | 0.5 part |
| Butyl stearate | 1 part |
| Stearic acid | 2 parts |
| Methyl ethyl ketone | 90 parts |
| Cyclohexanone | 50 parts |
| Toluene | 60 parts |

The results of examining the thickness variation rates of respective coatings at this time are shown in Table 2.

In each of the four kinds of coating heads, the deviation of the curvature center of a doctor edge surface was 3% of the blade thickness of the doctor edge surface, the deviation of slit width was 3 μm, and the deviation of a difference of height between adjacent edge surfaces was 2 μm. As for the designed dimensions of the coating heads, front edge surface blade thickness W1=downstream doctor edge surface blade thickness W3=1.0 mm, intermediate doctor edge surface blade thickness W2=0.5 mm, front edge surface curvature radius R1=6.0 mm, intermediate doctor edge surface curvature radius R2=2.0 mm, downstream doctor edge surface curvature radius R3=4.0 mm, curvature center position G1=0.12 mm, curvature center position G3=0.05 mm, upstream slit width S1=0.1 mm, downstream slit width S2=0.05 mm, and slope angle β=30°.

TABLE 2

| Intermediate doctor edge surface blade thickness variation rate R1 (%) | downstream doctor edge surface blade thickness variation rate R2 (%) | lower layer coating thickness variation rate T1 (%) | upper layer coating thickness variation rate T2 (%) | Judgement result |
|---|---|---|---|---|
| 13 | 5 | 22 | 10 | × |
| 6 | 5 | 12 | 12 | × |
| 5 | 12 | 6 | 14 | × |
| 5 | 7 | 5 | 10 | × |
| 5 | 5 | 4 | 4 | ○ |
| 5 | 3 | 5 | 5 | ○ |

As shown in Table 2, in the case where the blade thickness variation rate R1 of the intermediate doctor edge surface exceeded 5%, the thickness variation rates T1 and T2 of the lower and upper layer coatings could not be restrained even if the blade thickness variation rate R2 of the downstream doctor edge surface was set to be 5%. In addition, in the case where the blade thickness variation rate R2 of the downstream doctor edge surface exceeded 5%, the thickness variation rate T2 of the upper layer coating could not be restrained even if the blade thickness variation rate R1 of the upstream doctor edge surface was set to be 5%. On the other hand, in the case where the blade thickness variation rates R1 and R2 of the intermediate and downstream doctor edge surfaces were set to be not larger than 5%, the thickness variation rates T1 and T2 of the upper and lower layer coatings could be restrained to extremely low values. It was therefore found that it was possible to restrain both the thickness variations of the upper and lower layer coatings conspicuously if both the variation rates of blade thickness of the intermediate and downstream doctor edge surfaces do not exceed 5%. It was also found that no coating failure was produced at this time.

EXAMPLE 3

Figure 4:
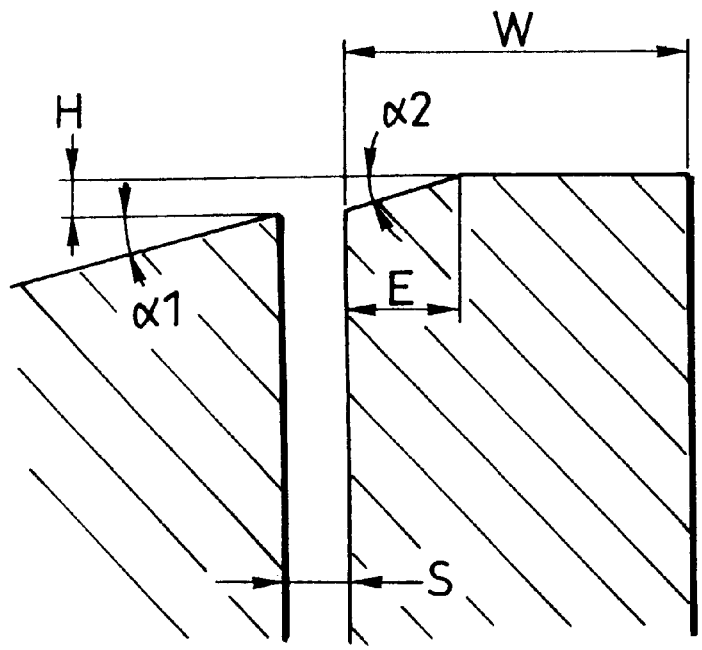
FIG. 4 is a diagram for explaining Example 3 of the present invention.

Four kinds of coating heads for single-layer coating were prepared. Each of the coating heads had a longitudinally sectional shape as shown in FIG. 4, and it was 500 mm wide in the width direction of a flexible support (not shown), but the coating heads were different in the deviation of a height difference H between adjacent edge surfaces. Such coating heads were used to apply coating composition so that the average value of dry thickness was 1.0 μm. As for the coating composition, one similar to that used in Example 1 was used.

The results of examining the thickness variation rate T of coating at this time are shown in Table 3.

In each of the four kinds of coating heads, the variation rate of the blade thickness of a doctor edge surface was 5%, and the deviation of slit width was 3 μm. As for the designed dimensions of the coating heads, doctor edge surface blade thickness W=5.0 mm, slope surface blade thickness E=0.5 mm, slit width S=0.3 mm, edge surface height difference H=0.18 mm, and front edge surface slope angle α1=slope angle α2=20°.

TABLE 3

| edge surface height deviation (μm) | coating thickness variation rate T (%) | Judgment result |
|---|---|---|
| 4.0 | 4 | ○ |
| 5.0 | 5 | ○ |
| 6.0 | 11 | × |
| 7.0 | 14 | × |

As shown in Table 3, when the deviation of a difference of height between adjacent edge surfaces was 6 μm or 7 1 μm, the coating thickness variation rate T became a high value of 11% or 14% correspondingly. On the other hand, when the deviation of a difference of height between adjacent edge surfaces was 4 μm or 5 μm, the variation rate T of coating thickness could be restrained to an extremely low value of 4% or 5% correspondingly. It was therefore found that it was possible to restrain the thickness variation of coating conspicuously if the deviation of a difference of height between adjacent edge surfaces does not exceed 5 μm. It was also found that no coating failure was produced at this time.

EXAMPLE 4

Figure 5:
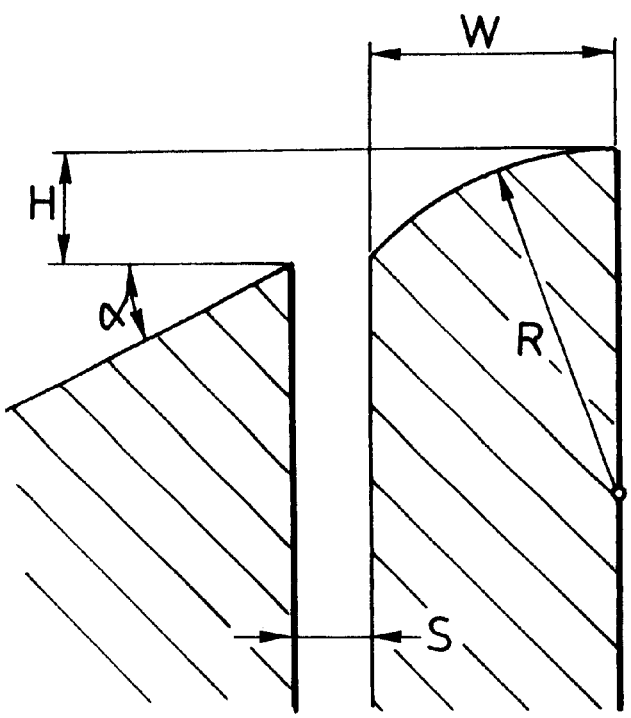
FIG. 5 is a diagram for explaining Example 4 of the present invention.

Three kinds of coating heads for single-layer coating were prepared. Each of the coating heads had a longitudinally sectional shape as shown in FIG. 5, and it was 1 m wide in the width direction of a flexible support (not shown), but the coating heads were different in the deviation of slit width S. Such coating heads were used to apply coating composition so that the average value of dry thickness was 3.0 μm. As for the coating composition, one similar to that used in Example 1 was used.

The results of examining the coating state at this time are shown in Table 4.

In each of the three kinds of coating heads, the variation rate of the blade thickness of a doctor edge surface was 4%, the deviation of the curvature center of the doctor edge surface was 5% of the blade thickness of the doctor edge surface, and the deviation of a difference of height between adjacent edge surfaces was 3 µm. As for the designed dimensions of the coating heads, doctor edge surface blade thickness W=0.3 mm, curvature radius R=1.0 mm, slit width S=0.3 mm, edge surface height difference H=0.25 mm, and front edge surface slope angle α=30°.

TABLE 4

| Slit width deviation (µm) | coating state | Judgment result |
| --- | --- | --- |
| 3.0 | Superior | ○ |
| 5.0 | Superior | ○ |
| 7.0 | Coating unevenness was produced by entrained air when slit adjustment was performed. | × |

As shown in Table 4, when the deviation of the slit width S was 7 µm, coating unevenness was produced by entrained air while the slit width was adjusted. On the other hand, when the deviation of the slit width S was 3 µm or 5 µm, a superior coating state in which the coating thickness had a little variation and there was no coating failure was obtained. It was therefore found that it was possible to restrain the thickness variation of coating conspicuously and it was possible to perform superior coating without producing any coating failure if the deviation of the slit width S does not exceed 5 µm.

EXAMPLE 5

Figure 6:
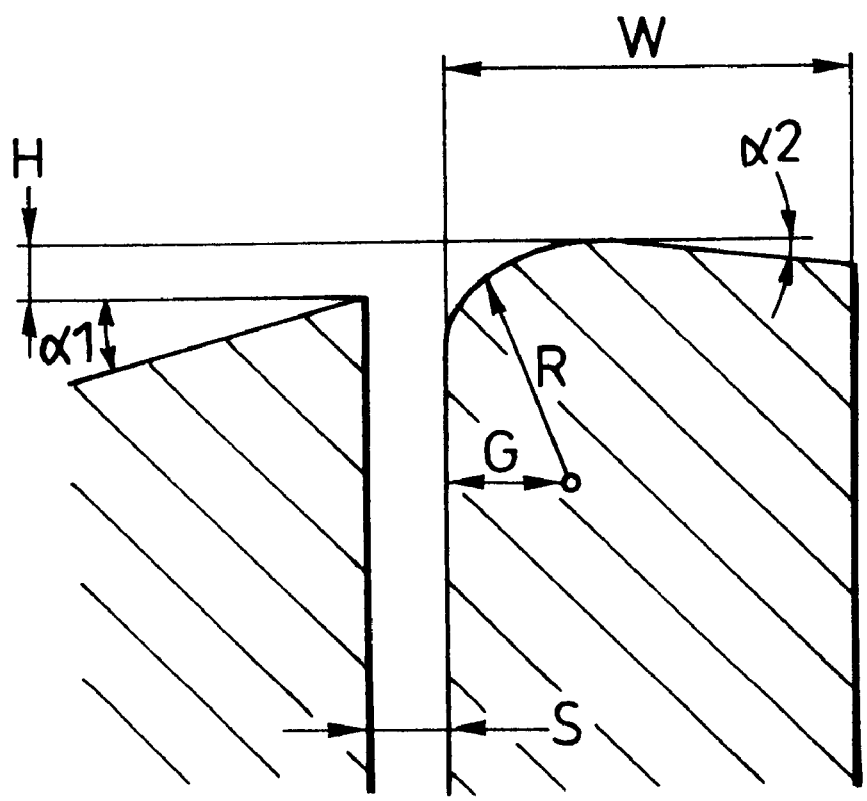
FIG. 6 is a diagram for explaining Example5 of the present invention.

Three kinds of coating heads for single-layer coating were prepared. Each of the coating heads had a longitudinally sectional shape as shown in FIG. 6, and it was 500 mm wide in the width direction of a flexible support (not shown), but the coating heads were different in the deviation of the curvature center of a curved surface in a doctor edge surface. Such coating heads were used to apply coating composition so that the average value of dry thickness was 1.5 µm. As for the coating composition, one similar to that used in Example 1 was used.

The results of examining the thickness variation rate of coating at this time are shown in Table 5.

In each of the three kinds of coating heads, the variation rate of the blade thickness of a doctor edge surface was 5%, the deviation of a difference of height between adjacent edge surfaces was 4 µm, and the deviation of slit width was 3 µm. As for the designed dimensions of the coating heads, doctor edge surface blade thickness W=3.5 mm, curvature center position G=0.5 mm, curvature radius R=2.0 mm, slit width S=0.2 mm, edge surface height difference H=0.18 mm, front edge surface slope angle α1=20°, and slope angle α2=5°.

TABLE 5

| ratio of deviation of curvature center of curved surface to curved surface blade thickness (%) | Coating thickness variation rate T (%) | Judgment result |
| --- | --- | --- |
| 3 | 4 | ○ |
| 5 | 5 | ○ |
| 7 | 10 | × |

As shown in Table 5, when the ratio of the deviation of the curvature center in the curved surface of the doctor edge surface to the blade thickness of the curved surface was 7%, the coating thickness variation rate T became a high value of 10%. On the other hand, when the ratio of the deviation of the curvature center to the blade thickness of the curved surface was 3% or 5%, the coating thickness variation rate T could be restrained to be an extremely low value of 4% or 5% correspondingly. It was therefore found that it was possible to restrain the thickness variation of coating conspicuously if the ratio of the deviation of the curvature center in the curved surface of the doctor edge surface to the blade thickness of the curved surface does not exceed 5%. It was also found that no coating failure was produced at this time.

As has been described above in detail, in a coating apparatus according to the present invention, the variation rate, in the support width direction, of blade thickness in the support running direction of a doctor edge surface is set to be not larger than 5%, so that it is possible to form a superior coating on a support without producing any thickness variation of the coating or any coating failure.

What is claimed is:

1. An extrusion coating apparatus for coating a flexible support which comprises a coating head having a front edge surface and a doctor edge surface with a slit arranged therebetween, wherein said coating head applies a coating liquid discharged from the slit onto a flexible support and wherein said coating head is positioned such that said doctor edge surface is pressed onto said support;

wherein blade thickness of said doctor edge surface in a direction of running of said support has a rate of variation not exceeding 5% in a direction of width of said support.

2. A coating apparatus according to claim 1, wherein said doctor edge surface has a curved surface, and a deviation of a curvature center of said curved surface in the direction of said blade thickness does not exceed 5% of blade thickness of said curved surface.

3. A coating apparatus according to claim 1 or 2, wherein a deviation of width of said slit does not exceed 5 µm.

4. A coating apparatus according to claim 1 or 2, wherein a deviation of a difference of height between adjacent edge surfaces of said coating head does not exceed 5 µm.

5. A coating apparatus according to claim 3, wherein a deviation of a difference of height between adjacent edge surfaces of said coating head does not exceed 5 µm.

* * * * *